(12) United States Patent
Lopatin et al.

(10) Patent No.: US 8,033,179 B2
(45) Date of Patent: Oct. 11, 2011

(54) PRESSURE MEASURING TRANSDUCER

(75) Inventors: Sergej Lopatin, Lörrach (DE);
Raimund Becher, Ehrenkirchen (DE);
Axel Humpert, Rheinau (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 83 days.

(21) Appl. No.: 12/309,633

(22) PCT Filed: Jun. 28, 2007

(86) PCT No.: PCT/EP2007/056507
§ 371 (c)(1),
(2), (4) Date: Jul. 31, 2009

(87) PCT Pub. No.: WO2008/012162
PCT Pub. Date: Jan. 31, 2008

(65) Prior Publication Data
US 2009/0301210 A1 Dec. 10, 2009

(30) Foreign Application Priority Data
Jul. 26, 2006 (DE) .......................... 10 2006 035 230

(51) Int. Cl.
*G01L 7/00* (2006.01)
(52) U.S. Cl. ....................................................... 73/756
(58) Field of Classification Search .................. None
See application file for complete search history.

(56) References Cited

U.S. PATENT DOCUMENTS
4,768,011 A 8/1988 Hattori

FOREIGN PATENT DOCUMENTS

| | | |
|---|---|---|
| DE | 30 18 856 A1 | 11/1981 |
| DE | 38 18 458 A1 | 12/1989 |
| DE | 42 34 290 A1 | 4/1994 |
| EP | 0 735 353 A1 | 10/1996 |
| EP | 0 759 547 A1 | 2/1997 |
| EP | 1 662 242 A1 | 5/2006 |
| EP | 10 2005 050 598 A1 | 5/2006 |

*Primary Examiner* — Andre Allen
(74) *Attorney, Agent, or Firm* — Bacon & Thomas, PLLC

(57) ABSTRACT

A dry, front-flush, pressure measuring transducer, which enables reliable measurements over a large temperature range. The transducer includes: a process connection made of a stainless steel and serving for securing the pressure measuring transducer to a measuring site; and a pressure sensor module, including a holder of stainless steel, into which a metal separating diaphragm is set front-flushly by means of a purely metal connection. A pressure to be measured acts on the separating diaphragm during measurement operation. The holder is set front-flushly by means of a purely metal connection into the process connection. The pressure sensor module further includes a titanium disk which is carried by the holder. A sapphire carrier with integrated silicon sensors is secured to the titanium disk. The titanium disk forms the separating diaphragm or it is physically connected with the separating diaphragm in such a manner that a deflection of the separating diaphragm effects a corresponding deflection of the titanium disk.

12 Claims, 3 Drawing Sheets

PRESSURE MEASURING TRANSDUCER

The invention concerns a pressure measuring transducer.

TECHNICAL FIELD

In the field of pressure measurement technology, pressure measuring transducers are used for registering pressures. The measured pressures are used in industry, for example, for open- or closed-loop control of processes.

BACKGROUND DISCUSSION

In a large number of industrial applications, pressure measuring transducers are exposed to drastic, sometimes very abrupt, fluctuations in temperature. Additionally, in certain industries, e.g. in the pharmaceutical industry, there are very high hygienic requirements. Normally in these industries, cleaning processes are used, in which the pressure sensors can be exposed to severe fluctuations in temperature. Examples of such cleaning processes are the so-called Cleaning in Place (CIP) or Sterilization in Place (SIP) processes, in which the containers are cleaned or sterilized without first removing the measuring devices or transducers. In such cases, for example, a spray head is arranged in the container for delivering cleaning chemicals and water or steam, and for rinsing, washing, or boiling the container as needed. Depending on the application, temperatures can range from e.g. −20° C. up to 200° C., for example.

Such a broad temperature range creates problems with respect to accuracy of the pressure measuring transducers. Pressure measuring transducers are usually assembled from various components of different materials, whose different thermal expansion as a function of temperature can lead to stressing, warping, and in the worst case, even deformation of the components.

Today, a number of pressure measuring transducers have diaphragm seals, which transfer a pressure to be measured, acting on a separating diaphragm, via a pressure-transferring liquid, to a pressure-sensitive, measuring element. Pressure-transferring liquids have coefficients of thermal expansion which work in such a way that the volume of the liquid contained in the pressure measuring transducer changes with the temperature. This leads to measurement errors. Furthermore, pressure-transferring liquids are never, or only reluctantly, used in certain applications in which there are high safety and/or hygiene requirements, because the danger exists that the liquid can leak out, if the pressure measuring transducer is damaged. In these applications, so-called "dry pressure transducers," i.e. such that do without a pressure-transferring liquid, are preferably used.

Today, semiconductor pressure transducers are preferably used. An especially preferred example is represented by sapphire carriers having integrated silicon sensors, e.g. silicon strain resistors or resistor bridge circuits. Such sensors are known from "Silicon on Sapphire" technology (SOS technology). They offer the advantage that they can be used at very low and also at very high temperatures.

In traditional silicon technology, the silicon sensors are placed on silicon carriers, and e.g. isolated by PN-junctions. However, this isolation is only effective at temperatures below approximately 150° C. In contrast, pressure sensors assembled with SOS technology offer the advantage that sapphire is a dielectric, which guarantees a good isolation of the integrated sensors at temperatures of up to 350° C.

Sapphire is mechanically highly stable, and has a crystal structure, which is compatible with that of silicon.

Sapphire carriers with integrated silicon sensors can be used in a very broad temperature range, and can also withstand sudden, drastic fluctuations in temperature. However, problems occur when, e.g., these pressure sensors are used in a measuring transducer made of stainless steel. Sapphire has a coefficient of thermal expansion of $8 \times 10^{-6}/K$, as contrasted with that of stainless steel, which is $16 \times 10^{-6}/K$.

Today, there are pressure measuring transducers, in which silicon sensors placed on sapphire are mounted on a separating diaphragm made of titanium. Titanium has a coefficient of thermal expansion which corresponds to that of sapphire. Titanium provides very high-value, but is also a very expensive material.

Another requirement of pressure measuring transducers, especially those in applications with high hygienic demands, is that of front-flushness. This means that the pressure measuring transducer must terminate in a plane facing the process, and especially may have no gaps, cavities and/or undercuts, into which the medium contained at the measuring site, and whose pressure is to be measured, can penetrate.

SUMMARY OF THE INVENTION

An object of the invention is to provide a dry, front-flush, pressure measuring transducer having a pressure sensor manufactured using SOS technology and enabling reliable measurements over a broad temperature range.

The invention resides in a pressure measuring transducer, including:
 a stainless-steel process connection, which serves for securing the pressure measuring transducer at a measuring site; and
 a pressure sensor module, including
 a stainless-steel holder,
 into which, by means of a purely metal connection, a metal separating diaphragm is front-flushly set, on whose outer side a pressure to be measured acts during measuring operations,
 which is set front-flushly into the process connection by means of a purely metal connection, and
 a titanium disk carried by the holder,
 on which a sapphire carrier with integrated silicon sensor is secured, and
 which forms the separating diaphragm, or which is mechanically connected with the separating diaphragm in such a manner that deflection of the separating diaphragm produces a corresponding deflection of the titanium disk.

In an embodiment, the metal connection between the holder and the process connection is a welded joint.

In a further development, the sapphire carrier is secured to the titanium disk by brazing.

In a first variant, the titanium disk forms the separating diaphragm, and the metal connection between the separating diaphragm and the holder includes a ring-shaped diaphragm carrier of titanium,
 which is welded front-flushly into the holder, and front-flushly terminates the process connection,
 into which the separating diaphragm is welded front-flushly, and
 which has, on its internal side facing the interior of the pressure measuring transducer, a ring-shaped, circumferential cavity,
  by which the diaphragm carrier is capable of absorbing stresses which can arise as a result of different coefficients of thermal expansion of the separating diaphragm and the process connection In a second variant, the separating diaphragm is composed of a stainless steel disk, the metal connection between the separating diaphragm and the holder is a welded joint, and titanium disk is placed on the interior side of the separating diaphragm.

In a further development of the second variant, the titanium disk is placed on a stainless steel separating diaphragm by means of a brazed connection, especially by means of a number of brazed connection points.

In a third variant,
the holder is tubular,
the separating diaphragm is a stainless steel disk,
which is set front-flushly into a first end of the holder,
the metal connection between the holder and the separating diaphragm is a welded connection,
the first end of the holder terminates front-flushly with the process connection,
the titanium disk is placed at a second end of the holder,
with the sapphire carrier with the integrated silicon sensors being arranged on the side of the titanium disk facing away from the holder, and
with an outer edge of the titanium disk being connected with the second end of the holder, and
a plunger connected with the separating diaphragm and the titanium disk is provided,
which serves to transfer a mechanical deflection of the separating diaphragm onto the titanium disk, and through it onto the sapphire carrier with the integrated silicon sensors.

Additionally, the invention includes a fourth variant, in which
the holder is a tubular segment, on whose inner wall a shelf is formed, which extends radially toward the interior of the holder, and which has a central, continuous cavity running coaxially to a longitudinal axis of the holder,
the separating diaphragm is a stainless steel disk,
which is set front-flushly into a first end of the holder,
the metal connection between the holder and the separating diaphragm is a welded joint,
the first end of the holder terminates front-flushly with the process connection,
a carrier element is provided, which is terminally closed by the titanium disk,
on which the sapphire carrier with the integrated silicon sensors is arranged on a side of the titanium disk facing away from the holder,
on whose side facing away from the titanium disk a tubular segment is formed, which is set terminally into the cavity of the shelf by means of a purely metal connection, and
a plunger connected with the separating diaphragm and the titanium disk is provided,
which leads through the cavity in the shelf and through the tubular segment, and
which serves to transfer a mechanical deflection of the separating diaphragm onto the titanium disk, and through it onto the sapphire carrier with the integrated silicon sensors.

In a further development of the fourth variant, the carrier element is a titanium housing, in whose outer wall a ring-shaped, circumferential recess is provided.

The invention resides further in a method for manufacturing a pressure measuring transducer of the first variant, wherein:
the titanium disk, serving as the separating diaphragm, is welded front-flushly into the ring-shaped, titanium diaphragm carrier by means of tungsten, inert-gas welding,
the sapphire carrier with the integrated silicon sensors is joined to the rear side of the titanium disk by brazing,
the diaphragm carrier is set front-flushly into a ring-shaped, stainless steel holder by means of electron beam welding, and
the holder is set front-flushly into a stainless steel process connection by means of tungsten, inert-gas welding.

The invention resides further in a method for manufacturing a pressure measuring transducer of the second variant, wherein:
the stainless steel disk serving as the separating diaphragm is welded front-flushly into the ring-shaped holder by means of tungsten, inert-gas welding,
the titanium disk is secured on the inner side of the stainless steel disk by means of brazing, especially using a number of brazed connection points,
the sapphire carrier with the integrated silicon sensors is joined to the rear side of the titanium disk by brazing, and
the holder is set front-flushly into a stainless steel process connection by means of tungsten, inert-gas welding.

The invention resides further in a method for manufacturing a pressure measuring transducer of the third variant, in which case:
the plunger is welded centrally on the stainless steel disk serving as the separating diaphragm,
the separating diaphragm is welded front-flushly into the first end of the tubular holder by means of tungsten, inert-gas welding,
the sapphire carrier with the integrated silicon sensors is joined to the rear side of the titanium disk by brazing,
the front side of the titanium disk is then connected with the plunger and the second end of the holder by brazing, and
the first end of the holder is welded front-flushly into the stainless steel process connection by means of tungsten, inert-gas welding.

Through the invention, it is possible to offer pressure measuring transducers with pressure sensors using SOS technology, which have a purely metal, front-flush closure to the process, and which do without pressure-transferring liquids.

A special advantage is that a pressure sensor module is used, which carries the sapphire carrier with the integrated silicon sensors and the titanium disk connected therewith. This module has a stainless steel holder, into which the separating diaphragm is front-flushly set by means of a purely metal connection, and which is directly front-flushly welded into the stainless steel process connection. In this way, it is possible to calibrate the pressure sensor in advance, and then to use it very flexibly in conjunction with different process connections.

A further advantage is that the pressure measuring transducer of the invention makes do with a very small amount of the very expensive material, titanium. Only a single titanium disk is needed, and only when such forms the separating diaphragm, is an adjacent titanium diaphragm carrier provided

BRIEF DESCRIPTION OF THE DRAWINGS

The invention will now be described in greater detail on the basis of the appended drawing, the figures of which show as follows.

DETAILED DISCUSSION

Figure 1:
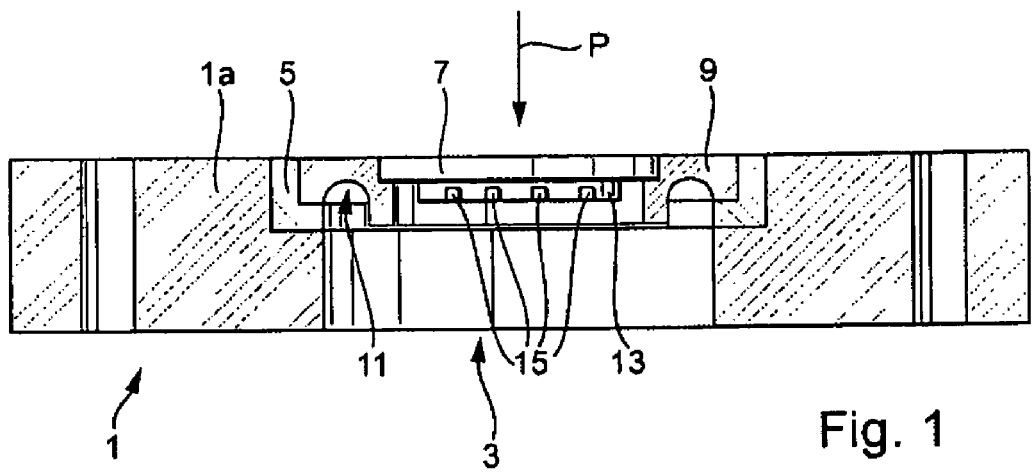
FIG. 1 a section through a pressure measuring transducer of the invention having a titanium separating diaphragm.
Figure 6:
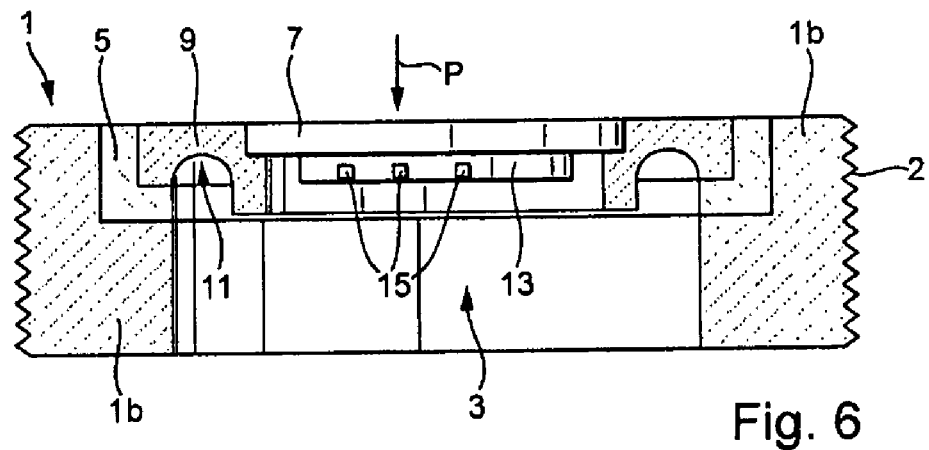
FIGS. 6 to 9 respectively, the pressure measuring transducers of FIGS. 1 to 4, where, in place of the flange illustrated in FIGS. 1 through 4, threading is provided for process connection.

FIG. 1 shows a section through a first example of an embodiment of the pressure measuring transducer of the invention. It includes a process connection 1, here a stainless steel flange 1a, which serves to mount the pressure measuring transducer on a measurement site. Alternatively, of course, other process connection variants known to those skilled in the art can be used. FIG. 6 shows the pressure measuring transducer illustrated in FIG. 1 involving a process connection 1 embodied as threaded connector 1b, which has external threading 2 that serves for screwing the pressure measuring transducer front-flushly into a corresponding threaded bore at the measurement site.

A pressure sensor module 3 is provided, which is set front-flushly into the process connection 1 by means of a purely metal connection. The pressure sensor module 3 includes a ring-shaped, stainless steel holder 5. The ring-shaped holder 5 is set front-flushly into the process connection. In the example of the embodiment shown here, the ring-shaped holder 5 has an L-shaped cross section, the outer edge of which is welded to the process connection 1.

Pressure sensor module 3 further includes a metal separating diaphragm 7, which is set front-flushly into the holder 5 by means of a purely metal connection. During measuring operations, a pressure to be measured is exerted on an outer side of the separating diaphragm 7. In the example of the embodiment shown in FIG. 1, the separating diaphragm 7 is composed of titanium.

The purely metal connection between the separating diaphragm 7 and stainless steel holder 5 includes a ring-shaped, diaphragm carrier 9 of titanium.

The ring-shaped diaphragm carrier 9 terminates front-flushly with the holder 5 and the process connection 1, and the separating diaphragm 7 is welded front-flushly into the diaphragm carrier 9. For this, the diaphragm carrier 9 has at the front of its inner side a ring-shaped ledge, on which the separating diaphragm 7 rests by means of its outer edge. The diaphragm carrier 9 thus lies between the titanium separating diaphragm 7, and the ring-shaped holder 5 joined with the process connection. The diaphragm carrier 9 sits in the holder 5, and its outer edge is welded with the inner edge of the holder 5, such that both components terminate front-flushly with the process connection. Holder 5 and process connection 1 are both stainless steel. The task of the diaphragm carrier 9 is to absorb stresses which can arise because of different coefficients of thermal expansion of the separating diaphragm 7, the holder 5, and the process connection 1. For this, the diaphragm carrier 9 has a ring-shaped circumferential cavity 11 on its inner side facing the interior of the pressure measuring transducer. Through this, the separating diaphragm 7 is protected from temperature-dependent warping, which might affect the reproducibility and precision of the measurements.

There results a purely metal, flush-mounted closure to the process. Therewith, the pressure measuring transducer is very easy to clean.

The pressure sensor module 3 further includes a sapphire carrier 13 with silicon sensors 15 integrated therein. The sapphire carrier 13 with the integrated silicon sensors 15 is a sensor chip manufactured using SOS technology. Preferably, the silicon sensors 15 are individual strain resistors, or resistor bridge circuits composed of such.

Pressure sensors manufactured using SOS technology are sufficiently known from the state of the art, and are thus not described here in detail. A great advantage of these pressure sensors is that they can be used over a very wide temperature range, e.g. from −70° C. to +200° C., and in the case of very suddenly occurring fluctuations in temperature.

The sapphire carrier 13 is bonded face-to-face on the surface of a titanium disk. The connection is preferably achieved by brazing. Alternatively, other soldering or brazing methods, e.g. vacuum soldering or vacuum brazing, can be used. Sapphire and titanium have practically identical coefficients of thermal expansion, such that even in the case of great and/or very rapid temperature changes, the two elements enjoy a connection to each other virtually free of stresses. Under the action of a pressure p, the surface of the sapphire carrier follows the surface of the titanium disk. In the example of the embodiment illustrated in FIG. 1, the titanium disk serves simultaneously as separating diaphragm 7.

The pressure measuring transducer illustrated in FIGS. 1 and 6 is preferably manufactured by first front-flushly welding the titanium disk serving as separating diaphragm 7 into the ring-shaped diaphragm carrier 9 by means of tungsten, inert-gas welding. Then, by brazing, the sapphire carrier 13 with integrated silicon sensors 15 is joined to a rear side of the titanium disk facing the interior of the pressure measuring transducer. The diaphragm carrier 9 is set front-flushly into the ring-shaped, stainless steel holder 5, preferably by means of electron beam welding. In doing so, vanadium is preferably used as filler metal. The holder 5 is set front-flushly into the stainless steel process connection 1, preferably by means of tungsten, inert-gas welding.

Figure 2:
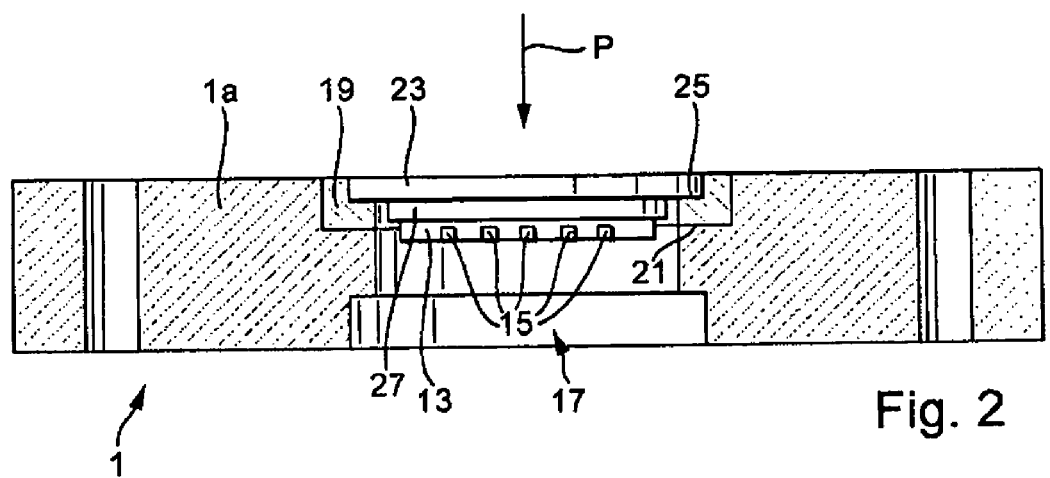
FIG. 2 a section through a pressure measuring transducer of the invention having a stainless steel separating diaphragm.
Figure 7:
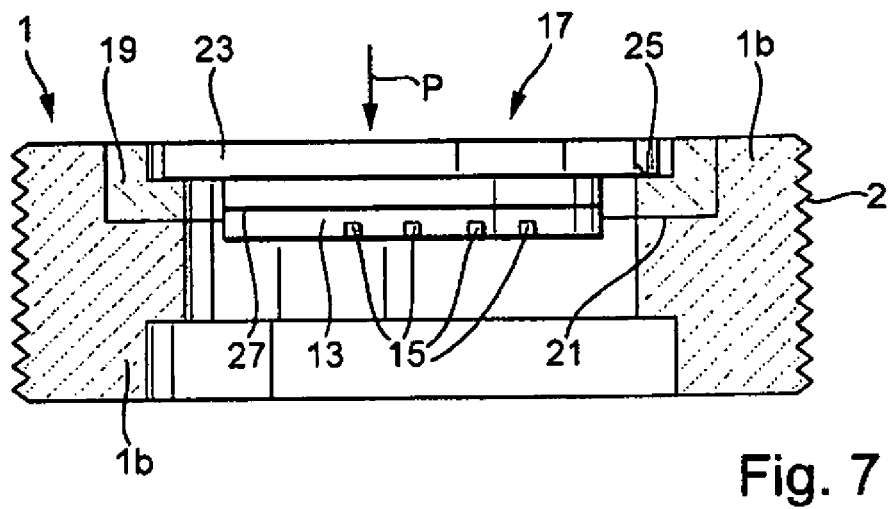

FIGS. 2 and 7 show a further example of an embodiment of a pressure measuring transducer of the invention. Exactly as in the case of the previously described example of an embodiment, this pressure measuring transducer includes a process connection 1 of stainless steel, which serves for mounting the pressure measuring transducer to a measuring site. The example of an embodiment shown in FIG. 2 is a flange, while that of FIG. 7 shows a threaded connector.

Also here, again a pressure sensor module 17 is provided, which is set front-flushly into the process connection 1 by means of purely metal connections. Pressure sensor module 17 includes a ring-shaped holder 19 of stainless steel, which is welded into the process connection 1. The ring-shaped holder 19 has an almost square cross section and is set into an equally shaped cavity 21 terminating front-flushly with the process connection 1. Holder 19 is welded at its outer edge to the process connection 1.

A metal separating membrane 23 is set front-flushly into the holder 19 by means of a purely metal connection. Other than in the case of the previous example of an embodiment, the separating membrane 23 here is not of titanium, but, instead, is of a stainless steel, and the purely metal connection is implemented by welding, via which the separating membrane 23 is set front-flushly directly into the holder 19. For this, holder 19 has on its front, inner side a ring-shaped shelf 25, on which the separating membrane 23 sits with an outer edge.

Preferably, the same material is used for the separating membrane 23 as is used for the holder 19 and the process connection 1. This offers the advantage that process connection 1, holder 19 and separating membrane 23 have the same coefficients of thermal expansion, so that temperature-dependent stressing, or warping, of the separating membrane 23 is largely avoided.

The pressure sensor module 17 includes, also here again, the already described sapphire carrier 13 applied to a titanium disk 27 and bearing the integrated silicon sensors 15. Other than in the case of the previous example of an embodiment, titanium disk 27, however, forms here not directly the separating membrane, but is, instead, physically connected with the separating diaphragm 23 in such a manner that a deflection of the separating diaphragm 23 effects a corresponding deflection of the titanium disk 27. To achieve this, the titanium disk 27 is applied to the inner side of the separating membrane 23. For this, e.g. a brazed connection, or a vacuum soldering or brazing, is utilized.

Preferably, this connection is accomplished via brazed connecting points distributed over the connecting surface. These point connections are sufficient to transmit the pressure p acting on the separating membrane 23 from the surface of the separating membrane 23 to the surface of the titanium disk 27. Supplementally, they allow sufficient play for the thermal expansion of the connected elements, so that, in the case of changes of temperature, only low shear forces act on the brazed connecting points and thereby on the titanium disk 27. The pressure sensor module 17 is, in this way, despite the different coefficients of thermal expansion of stainless steel and titanium, protected against temperature-related stresses, or warping.

This last-described pressure transducer is preferably manufactured by welding the stainless steel disk serving as separating diaphragm 23, by means of tungsten/inert-gas welding, front-flushly into the ring-shaped holder 19 of stainless steel. Thereafter, the titanium disk 27 is applied by means of brazing, preferably by means of brazed connection points, on the inner side of the stainless steel disk. Then, the sapphire carrier 13 with the integrated silicon sensors 15 is soldered or brazed onto the rear side of the titanium disk 15. This is done preferably by brazing or by vacuum soldering or brazing. Thereafter, the so-formed unit is set front-flushly into the process connection 1 by setting the holder 19 by means of tungsten, insert-gas welding front-flushly into the process connection 1 of stainless steel.

Figure 3:
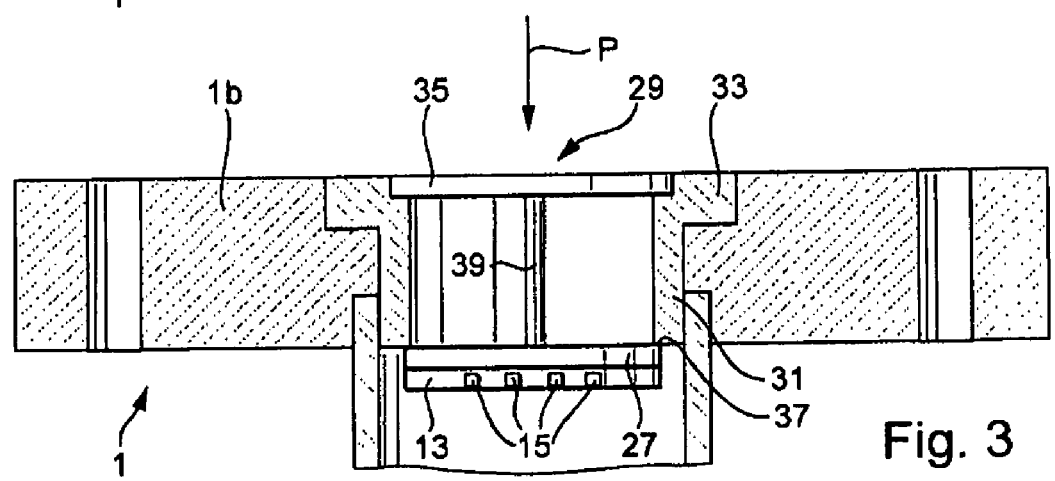
FIG. 3 a section through a pressure measuring transducer of the invention having a stainless steel separating diaphragm, which is connected with a titanium disk via a plunger.
Figure 8:
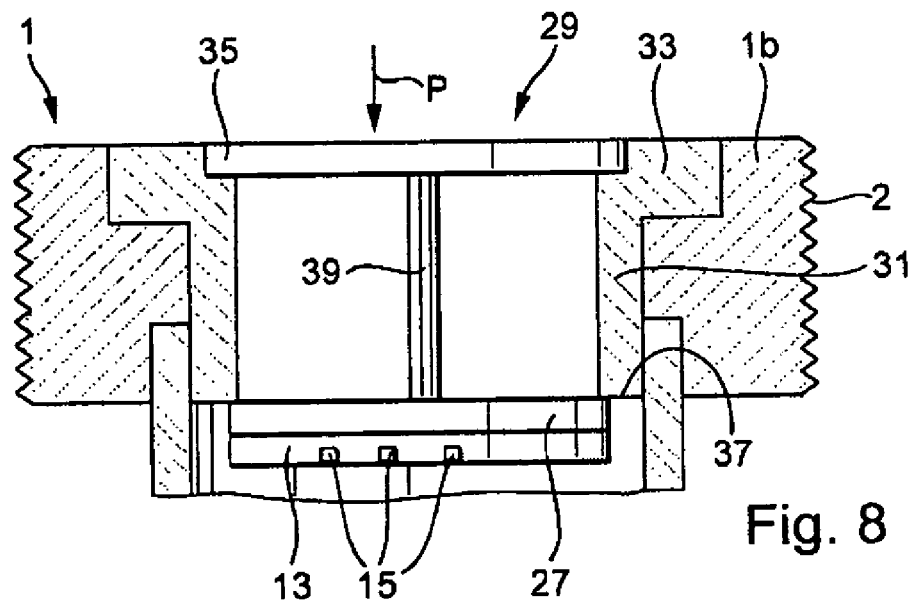

FIGS. 3 and 8 show a further example of an embodiment of a pressure measuring transducer of the invention. Exactly as in the case of the previously described example of an embodiment, the pressure measuring transducer includes a process connection 1 of stainless steel, which serves for securing the pressure measuring transducer to a measuring site. The embodiment of FIG. 3 illustrates a flange, while FIG. 8 utilizes a threaded connector.

As in the case of the other examples of embodiments, also here, a pressure sensor module 29 is provided, which has a holder 31 of stainless steel set into the process connection 1 by means of a purely metal connection. The purely metal connection is, for example, a welded joint.

Holder 31 is essentially tubular and includes a first end 33, which terminates front-flushly with the process connection 1. Set into this first end 33 front-flushly by means of a purely metal connection is the metal separating diaphragm 35. Holder 31 includes for this, on its front end, a ring-shaped recess, whose depth equals the thickness of the separating diaphragm 35. Separating diaphragm 35 is made of stainless steel in the examples of embodiments shown in FIGS. 3 and 8. Preferably used for this, also here, is the same material used for holder 31 and process connection 1. This offers the advantage that holder 31, process connection 1, and separating diaphragm 35 have the same coefficient of thermal expansion, so that temperature-dependent stresses and warping of the separating diaphragm 35 are largely avoided.

The pressure sensor module 29 includes, also here again, the already described sapphire carrier 13 applied to a titanium disk 27 and bearing the silicon sensors 15 integrated therein. The titanium disk 27 serves here not directly as the separating membrane, but, instead, is physically connected with the separating diaphragm 35 in such a manner that a deflection of the separating membrane 35 effects a corresponding deflection of the titanium disk 27.

It is arranged on a second end 37 of the tubular holder 31 in such a manner that it closes its second end 37 off, and an outer edge of the titanium disk 27 is connected with a ring-shaped end surface of the second end of the holder 31. The connection is accomplished e.g. by brazing or vacuum soldering or brazing. In such case, the sapphire carrier 13 with the silicon sensors 15 integrated therein is arranged on an outer side of the titanium disk 27 facing away from the holder 31. Separating membrane 35 is connected via a purely physical connection, here a plunger 39, with the titanium disk 27 in such a manner that a mechanical deflection of the separating diaphragm 35 is transmitted to the titanium disk 27 and therethrough to the sensor chip. Also here, sapphire carrier 13 is connected by brazing or by vacuum soldering or brazing with the titanium disk 27.

This last described pressure measuring transducer is manufactured preferably by welding the plunger 39 centrally on the stainless steel disk serving as separating membrane 35. Then, the separating membrane 35 connected with the plunger 39 is welded by means of a tungsten, inert-gas welding, front-flushly into the first end 33 of the tubular holder 31 of stainless steel. In parallel, the sapphire carrier 13 is joined to the rear side of titanium disk 27 by means of brazing or vacuum soldering or brazing. Subsequently, the front side of the titanium disk 27 is connected with the plunger 39 and the second end 37 of the holder 31 by brazing or vacuum soldering or brazing.

Finally, the pressure sensor module 29 obtained in this way is set front-flushly into the process connection 1 by welding the first end 33 of the holder 31 by means of tungsten, inert-gas welding front-flushly into the process connection 1.

Figure 4:
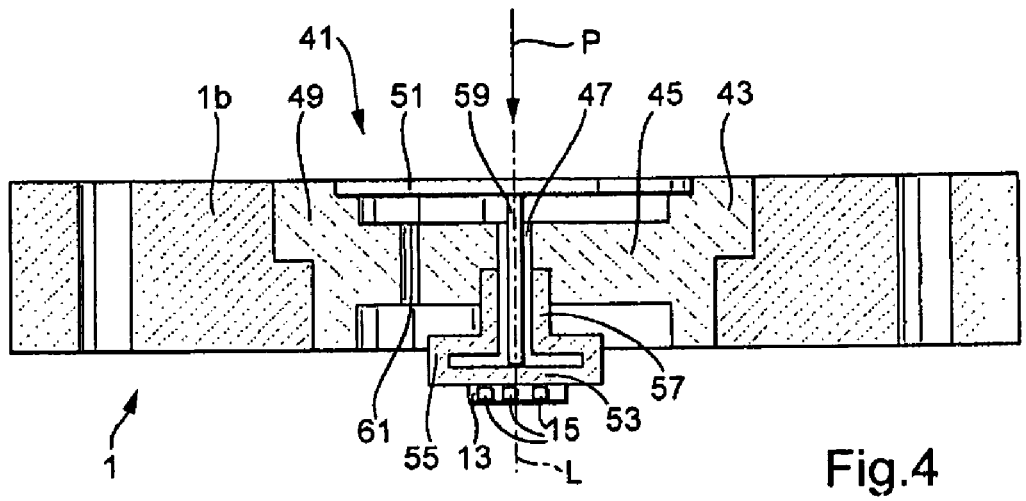
FIG. 4 a section through a pressure measuring transducer of the invention having a stainless steel separating diaphragm; which is connected with a titanium disk via a plunger, in which case the titanium disk is a component of a carrier element.
Figure 9:
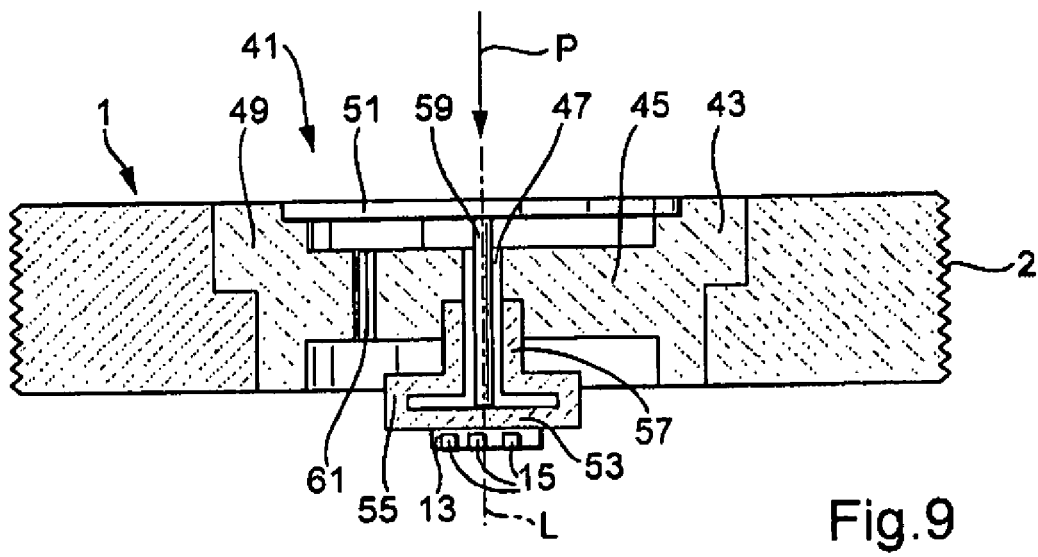

FIGS. 4 and 9 show a further example of an embodiment of a pressure measuring transducer of the invention. Exactly as in the case of the previously described example of an embodiment, this pressure measuring transducer includes a process connection 1 of stainless steel, which serves for securing the pressure measuring transducer at a measuring site. In the example of an embodiment illustrated in FIG. 4, a flange is shown, while in FIG. 9, a threaded connector is used.

As also in the case of the other examples of embodiments, also here a pressure sensor module 41 is provided, which includes a holder 43 of stainless steel set front-flushly into the process connection 1 by means of a purely metal connection. The purely metal connection is, for example, a welded joint.

Holder 43 is an essentially tubular piece, on whose inner wall a shelf 45 extending radially inwardly into its interior is formed having a central cavity 47 extending through the holder 43 coaxially to a longitudinal axis L of the holder 43.

Holder 43 includes a first end 49, which terminates front-flushly with the process connection 1. Into this first end 49 is set front-flushly by means of a purely metal connection the metal separating membrane 51. Holder 43 includes for this, on its front side, a ring-shaped recess, whose depth equals the thickness of the separating diaphragm 51. The separating diaphragm 51 is of a stainless steel in the examples of embodiments presented in FIGS. 4 and 9. Preferably, for this, also here the same material is used as for the holder 43 and the process connection 1. This offers the advantage that the holder 43, process connection 1 and separating membrane 51 have the same coefficient of thermal expansion, and temperature-dependent stresses and warping of the separating diaphragm 51 are largely avoided.

The pressure sensor module 41 includes also here again the already-described sapphire carrier 13 secured to a titanium disk and having the silicon sensors 15 integrated therein. The titanium disk 53 serves here not directly as separating diaphragm, but is, instead, physically connected with the separating diaphragm 51 in such a manner that a deflection of the separating diaphragm 51 effects a corresponding deflection of the titanium disk 53.

In departure from the previously described example of an embodiment, here, a carrier element 55 closed on one end by the titanium disk 53 is provided. Arranged against carrier element 55 is the sapphire carrier 13 with the silicon sensors 15 integrated therein. Sapphire carrier 13 is arranged on the side of the titanium disk 53 facing away from the holder 43. In the illustrated example of an embodiment, the carrier element 55 is preferably a one-piece, essentially cylindrical housing of titanium, whose floor forms the titanium disk 53. Formed on the housing on its side facing away from the titanium disk 53 is a tubular segment 57, which is set into the cavity 47 of the shelf 45 by means of a purely metal connection. Cavity 47 has for this on its side facing away from the separating diaphragm 51 a region of enlarged inner diameter, into which the tubular segment 57 is set in such a manner that the inner wall of the tubular segment 57 closes flushly with the inner wall of the cavity 47. The purely metal connection is preferably a welded connection or a soldering or a brazing.

Exactly as in the case of the last described example of an embodiment, also here a plunger 59 is provided, which is connected with the separating diaphragm 51 and the titanium disk 53. Plunger 59 is, for example, welded centrally on the inner side of the separating diaphragm 51 and leads parallel to the longitudinal axis L of the holder 43 through the cavity 47 in the shelf 45 and the tubular segment 57 into the housing, where it is connected with the inner side of the titanium disk 53, for example by means of a brazed connection. Plunger 59 serves also here for transmitting the mechanical deflection of the separating diaphragm 51 onto the titanium disk 53 and therefrom onto the sapphire carrier 13 with the silicon sensors 15 integrated therein.

Depending on the formation of the shelf 45, an internal volume can be created in the holder 43 enclosed by the separating membrane 51, the shelf 45 and the carrier element 55. In such case, preferably a pressure equalizing bore 61 is provided leading through the shelf 45.

An advantage of this embodiment is that the connection between titanium and stainless steel occurs via the tubular segment 57. The diameter of the tube segment 57 is very much less than that of the titanium disk 53. This means a lesser contact surface and a higher thermal stability of the construction. Additionally, the connection between titanium and stainless steel is spatially separated from the titanium disk 53. In this way, effects of thermal stresses in the region of the contact surfaces on the titanium disk 53 are markedly reduced.

Figure 5:
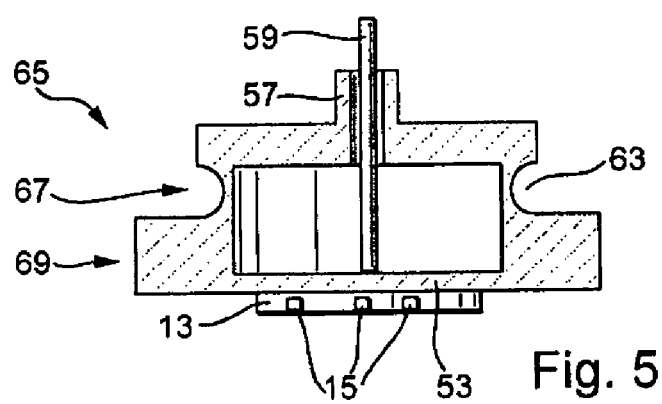
FIG. 5 a modification of the carrier element of FIG. 4 with a ring-shaped, circumferential recess.

The effects of these thermal stresses on the titanium disk 53 can be yet further reduced by a ring-shaped cavity 63 in the outer wall of the carrier element 65. FIG. 5 shows an example of such a carrier element 65. There, the carrier element 65 is likewise a titanium housing having a tubular segment 57 formed thereon to create a housing neck set into the shelf 45 by means of a metal connection. The inner space of the carrier element 65 is cylindrical. The wall of carrier element 65 has a cylindrical region 67, which borders the tubular segment 57, has a lesser wall thickness, and is bounded outside by the ring-shaped cavity 63. Because of the cavity 63, this housing section can absorb stresses arising due to the different coefficients of thermal expansion of the tubular segment 57 and the shelf 45. Following on region 67 is a cylindrical region 69, which lies on the opposite end from the tubular segment 57, borders the titanium disk 53, and has a greater wall thickness. The differing wall thicknesses offer an additional protection of the titanium disk 53 against warping.

All described pressure measuring transducers offer the advantage that they are frontally flush and have a purely metal closure against the process. Thereby, they are especially suited for applications in which high demands are placed on hygiene. They are very easy to clean and can be applied due to their manner of construction not only over a broad temperature range but also in the case of abrupt temperature changes, such as can arise in the case of the initially mentioned, industrial cleaning- and/or sterilization procedures. This is especially possible, because all connections are metal connections and pressure transmitting liquids do not need to be used.

A further advantage is that always where metals of different coefficients of thermal expansion can meet one another, elastic connecting means have been chosen, which are able to absorb stresses arising because of the different expansions of the individual, mutually abutting elements. In the case of the pressure measuring transducer illustrated in FIG. 1, these elastic connecting means include the diaphragm carrier 9. In the case of the pressure transducer of FIG. 2, they include the brazed connection points between the separating diaphragm 23 of stainless steel and the titanium disk 27. In the case of the pressure measuring transducers of FIGS. 3, 4 and 5, the arising of such stresses is avoided by the transmission of the deflection of the separating diaphragm 35 via plunger 39, or 59, as the case may be.

A further advantage is that the pressure measuring transducers of the invention are modularly constructed. The pressure sensor modules 3, 17, 29, 41 can therefore be calibrated first and then very flexibly set into different types of process connections.

The invention claimed is:

1. A pressure measuring transducer comprising:
   a process connection of stainless steel, which serves for securing the pressure measuring transducer to a measuring site;
   a pressure sensor module comprising a holder of stainless steel, into which is set front-flushly, by means of a purely metal connection, a metal separating diaphragm, on whose outer side a pressure to be measured acts during operation, and which is set into the process connection front-flushly by means of a purely metal connection; and
   a titanium disk carried by said holder on which a sapphire carrier having integrated silicon sensors is secured, and which forms said metal separating diaphragm or which is physically connected with said metal separating diaphragm in such a manner, that a deflection of said metal separating diaphragm effects a corresponding deflection of said titanium disk.

2. The pressure measuring transducer as claimed in claim 1, wherein:
said metal connection between said holder and said process connection is a welded joint.

3. The pressure measuring transducer as claimed in claim 1, wherein:
said sapphire carrier is secured to said titanium disk by brazing.

4. The pressure measuring transducer as claimed in claim 1, wherein:
said titanium disk forms said separating diaphragm and said metal connection between said titanium diaphragm and said holder comprises a ring-shaped diaphragm carrier of titanium, which is welded front-flushly into said holder and terminates front-flushly with said process connection, into which the titanium diaphragm is welded front-flushly, and which has on its inner side facing into the interior of the pressure measuring transducers a ring-shaped cavity, by way of which said diaphragm carrier is able to absorb stresses, which can arise from the different coefficients of thermal expansion of said metal separating diaphragm and said process connection.

5. The pressure measuring transducer as claimed in claim 1, wherein:
said metal separating diaphragm comprises a stainless steel disk;
said metal connection between said metal separating diaphragm and said holder is a welded joint; and
said titanium disk is secured to an inner side of said metal separating diaphragm.

6. The pressure measuring transducer as claimed in claim 5, wherein:
said titanium disk is secured to said metal separating diaphragm of stainless steel by means of a brazed connection, especially by means of a plurality of brazed connecting points.

7. The pressure measuring transducer as claimed in claim 1, wherein:
said holder is tubular;
said metal separating diaphragm is a stainless steel disk, which is set front-flushly into a first end of said holder;
said metal connection between said holder and said metal separating diaphragm is a welded joint;
said first end of said holder terminates front-flushly with said process connection;
said titanium disk is secured on a second end of said holder, wherein said sapphire carrier with the integrated silicon sensors is secured to a side of said titanium disk facing away from said holder, and wherein an outer edge of said titanium disk is connected with said second end of said holderl; and
a plunger connected with said metal separating diaphragm and said titanium disk is provided, which serves for transmitting a mechanical deflection of said metal separating diaphragm to the titanium disk and therethrough to said sapphire carrier with said silicon sensors integrated therein.

8. The pressure measuring transducer as claimed in claim 1, wherein:
said holder is a tubular segment, on whose inner wall a shelf is formed, which has a central, traversing cavity extending coaxially to a longitudinal axis of said holder;
said metal separating diaphragm is a stainless steel disk, which is set front-flushly into a first end of said holder;
the metal connection between said holder and said metal separating diaphragm is a welded joint;
said first end of said holder terminates front-flushly with said process connection;
a carrier element closed terminally by said titanium disk is provided, on which said sapphire carrier with said integrated silicon sensors is arranged on a side of said titanium disk facing away from said holder, and on whose side facing away from said titanium disk is formed a tubular segment, which is set terminally by means of a purely metal connection into the cavity of said shelf; and
a plunger connected with said metal separating diaphragm and said titanium disk is provided, which leads through said cavity in said shelf and said tubular segment, and which serves for transmitting a mechanical deflection of said separating diaphragm to said titanium disk and therethrough to said sapphire carrier with said integrated silicon sensors.

9. The pressure measuring transducer as claimed in claim 8, wherein:
said separating diaphragm is a titanium housing, in whose outer wall a ring-shaped recess is provided.

10. A method for manufacturing a pressure measuring transducer as claimed in claim 3, comprising the steps of:
welding the titanium disk serving as separating diaphragm by means of tungsten, inert-gas welding front-flushly into the ring-shaped diaphragm carrier of titanium;
joining the sapphire carrier with the integrated silicon sensors by brazing to the rear side of the titanium disk;
setting the membrane carrier by means of electron-beam welding front-flushly into a ring-shaped holder of stainless steel; and
setting the holder by means of tungsten, inert-gas welding front-flushly into a process connection of stainless steel.

11. A method for manufacturing a pressure measuring transducer as claimed in claim 5, comprising the steps of:
welding the stainless steel disk serving as separating diaphragm by means of tungsten inert-gas welding front-flushly into the ring-shaped holder of stainless steel;
joining the titanium disk by means of brazing, especially by means of a plurality of brazed connecting points, onto the inner side of the stainless steel disk;
joining the sapphire carrier with the integrated silicon sensors by brazing to the rear side of the titanium disk; and
setting the holder by means of tungsten inert-gas welding front-flushly into the process connection of stainless steel.

12. A method for manufacturing a pressure measuring transducer as claimed in claim 7, comprising the steps of:
welding the plunger centrally onto the stainless steel disk serving as separating diaphragm;
joining the separating diaphragm by means of tungsten, inert-gas welding front-flushly into the first end of the tubular holder of stainless steel;
joining the sapphire carrier with the integrated silicon sensors by brazing to the rear side of the titanium disk;
connecting the front side of the titanium disk by brazing with the plunger and the second end of the holder; and
welding the first end of the holder by means of tungsten, inert-gas welding front-flushly into the process connection of stainless steel.

* * * * *